US011796557B2

United States Patent
Fontanesi

(10) Patent No.: US 11,796,557 B2
(45) Date of Patent: Oct. 24, 2023

(54) TWIST INSENSITIVE MOUNTING DIFFERENTIAL SPEED SENSOR WITH DIRECTION DETECTION

(71) Applicant: Infineon Technologies AG, Neubiberg (DE)

(72) Inventor: Simone Fontanesi, Villach (AT)

(73) Assignee: Infineon Technologies AG, Neubiberg (DE)

( * ) Notice: Subject to any disclaimer, the term of this patent is extended or adjusted under 35 U.S.C. 154(b) by 430 days.

(21) Appl. No.: 17/183,763

(22) Filed: Feb. 24, 2021

(65) Prior Publication Data

US 2022/0268803 A1 Aug. 25, 2022

(51) Int. Cl.
*G01P 3/56* (2006.01)

(52) U.S. Cl.
CPC ..................... *G01P 3/56* (2013.01)

(58) Field of Classification Search
CPC .......... G01D 5/12; G01D 5/14; G01D 5/142; G01D 5/244; G01P 3/42; G01P 3/44; G01P 3/48; G01P 3/481; G01P 3/487; G01P 3/56

See application file for complete search history.

(56) References Cited

U.S. PATENT DOCUMENTS

| 9,933,448 | B1 | 4/2018 | Binder | |
| 2016/0041006 | A1* | 2/2016 | Ausserlechner | G01R 33/077 324/207.2 |
| 2018/0196080 | A1* | 7/2018 | Binder | G01D 5/147 |
| 2019/0086236 | A1* | 3/2019 | Binder | G01D 5/147 |

\* cited by examiner

*Primary Examiner* — Giovanni Astacio-Oquendo
*Assistant Examiner* — David B Frederiksen
(74) *Attorney, Agent, or Firm* — Harrity & Harrity, LLP

(57) ABSTRACT

A magnetic sensor includes a plurality of pairs of sensor elements, with each pair of sensor elements including two sensor elements that are oppositely disposed on a circumference of a circle arranged in a sensor plane of the magnetic sensor; and a sensor circuit configured to generate a first pulsed output signal based on a selected differential measurement signal that is indicative of a rotational speed of an object. The sensor circuit is configured to generate a plurality of differential measurement signals, one for each of the plurality of pairs of sensor elements, where each of the plurality of differential measurement signals is derived from sensor signals generated by a corresponding pair of sensor elements. The sensor circuit is further configured to select a differential measurement signal having a greatest magnitude from among the plurality of differential measurement signals as the selected differential measurement signal.

20 Claims, 8 Drawing Sheets

| Twist Angle | Direction | 1st Pair | 2nd Pair | 3rd Pair | 4th Pair |
|---|---|---|---|---|---|
| 0 | + | 0 | + | + | + |
| 22.5 | + | - | + | + | + |
| 45 | + | - | + | + | 0 |
| 67.5 | + | - | + | + | - |
| 90 | - | - | 0 | + | - |
| 112.5 | - | - | - | + | - |
| 135 | - | - | - | 0 | - |
| 157.5 | - | - | - | - | - |
| 180 | - | 0 | - | - | - |
| 202.5 | - | + | - | - | - |
| 225 | - | + | - | - | 0 |
| 247.5 | - | + | - | - | + |
| 270 | + | + | 0 | - | + |
| 292.5 | + | + | + | - | + |
| 315 | + | + | + | 0 | + |
| 337.5 | + | + | + | + | + |

FIG. 2

TWIST INSENSITIVE MOUNTING DIFFERENTIAL SPEED SENSOR WITH DIRECTION DETECTION

BACKGROUND

To measure wheel speed (e.g., in an automotive application) typically a ferromagnetic wheel is used in combination with a magnetic sensitive sensor and a magnet mounted to the sensor. The sensor generates output-pulses. A control unit counts the pulses and is able to calculate wheel-speed and actual angle of the rotating wheel, as well as optionally determine the rotation direction of the wheel.

In camshaft sensing applications, a Hall monocell configuration may be used that enables output switching at the tooth edge of a toothed wheel. A z-magnetized back bias sensor in combination with the Bz-sensitive monocell sensor generates a sinusoidal signal as the ferrous target wheel rotates in front of the sensor. The maximum amplitude is achieved when a tooth passes the sensor, while the minimum signal is achieved when the sensor faces a notch of the toothed wheel. Thus, the sensor device switches on the tooth edge.

A benefit in using a Hall monocell sensor is that the sensor is twist-insensitive such that the sensor will work independent from a mounting position regardless of its rotational orientation around its z-axis. Thus, an air-gap between the sensor module and the wheel can be adjusted during mounting using a screw. That is, twisting the sensor module like a screw will adjust the air gap and the rotational orientation of the sensor can be disregarded. Accordingly, the assembly tolerances are relaxed during mounting of the sensor due to the twist-insensitivity.

On the downside, Hall monocell sensors have a disadvantage in terms of stray-field robustness. Stray-fields are magnetic fields that are introduced by external means located in the proximal environment of the sensor. For example, components located within a vehicle (e.g., for hybrid cars due to current rails driving high electrical currents close to the sensing device or due to inductive battery charging) or a currents flowing through a railway of a train system that generates magnetic fields may cause stray-field disturbance.

Alternative to the Hall monocell sensor, differential Hall sensing elements may be used to increase the stray-field robustness. In a differential Hall sensor, two Hall plates are spaced apart. The output signal is calculated by subtracting the Bz signal of the first Hall plate from the Bz signal of the second Hall plate, and a homogeneous stray-field in the z-direction will cancel out due to the differential calculation.

The differential Hall signal has its signal maximum at the rising edge of a tooth of the wheel and its signal minimum at the falling edge of a tooth of the wheel. Thus, in contrast to the Hall monocell sensor, the output of the differential Hall sensor switches on the tooth center and the notch center.

However, because the switching point is different, a vehicle's electronic control unit (ECU) needs to be reconfigured to adjust the switching point. Furthermore, another disadvantage of the differential Hall sensor is that it is not twist-insensitive. Twisting the sensor module around its z-axis, will result in a decreasing signal. The worst case is a twist angle of 90°, where both Hall plates sense the same Bz-field. In this case no differential signal is available and the sensor is not able to detect a tooth or a notch.

Therefore, an improved device that is both stray-field robust and twist-insensitive (i.e., twist independent) may be desirable.

SUMMARY

Magnetic sensor modules, systems and methods are provided, configured to detect a rotation of an object, and more particularly, to detect a speed of rotation of an object.

One or more embodiments provide a magnetic sensor configured to detect a rotation of an object. The magnetic sensor includes a plurality of sensor elements arranged in a sensor plane of the magnetic sensor, wherein the plurality of sensor elements is configured to generate a plurality of sensor signals in response to sensing an oscillating magnetic field modulated by the rotation of the object, with each sensor signal being generated by one of the plurality of sensor elements, wherein the plurality of sensor elements are arranged on a circumference of a circle, wherein plurality of sensor elements are grouped into a plurality of pairs of sensor elements, with each pair of sensor elements including two sensor elements that are oppositely disposed on the circumference of the circle; and a sensor circuit configured to generate a first pulsed output signal based on a selected differential measurement signal that is indicative of a rotational speed of the object, wherein the sensor circuit is configured to generate a plurality of differential measurement signals, one for each of the plurality of pairs of sensor elements, using the plurality of sensor signals, wherein each of the plurality of differential measurement signals is derived from sensor signals generated by a corresponding pair of sensor elements, and wherein the sensor circuit is configured to select a differential measurement signal having a greatest magnitude from among the plurality of differential measurement signals as the selected differential measurement signal.

One or more embodiments provide a method of measuring a rotation of rotating object by a magnetic sensor, the magnetic sensor including a plurality of sensor elements arranged on a circumference of a circle in a sensor plane of the magnetic sensor and being grouped into a plurality of pairs of sensor elements, with each pair of sensor elements including two sensor elements that are oppositely disposed on the circumference of the circle. The method includes generating a plurality of sensor signals by the plurality of sensor elements in response to sensing an oscillating magnetic field modulated by the rotation of the rotating object, with each sensor signal being generated by one of the plurality of sensor elements; generating a first pulsed output signal based on a selected differential measurement signal that is indicative of a rotational speed of the rotating object; generating a plurality of differential measurement signals, one for each of the plurality of pairs of sensor elements, using the plurality of sensor signals, wherein each of the plurality of differential measurement signals is derived from sensor signals generated by a corresponding pair of sensor elements; and selecting a differential measurement signal having a greatest magnitude from among the plurality of differential measurement signals as the selected differential measurement signal.

BRIEF DESCRIPTION OF THE DRAWINGS

Embodiments are described herein making reference to the appended drawings.

FIG. 2 shows a table that provides a twist direction and angle algorithm summary utilized by a sensor circuit according to one or more embodiments;

DETAILED DESCRIPTION

Figure 1A:
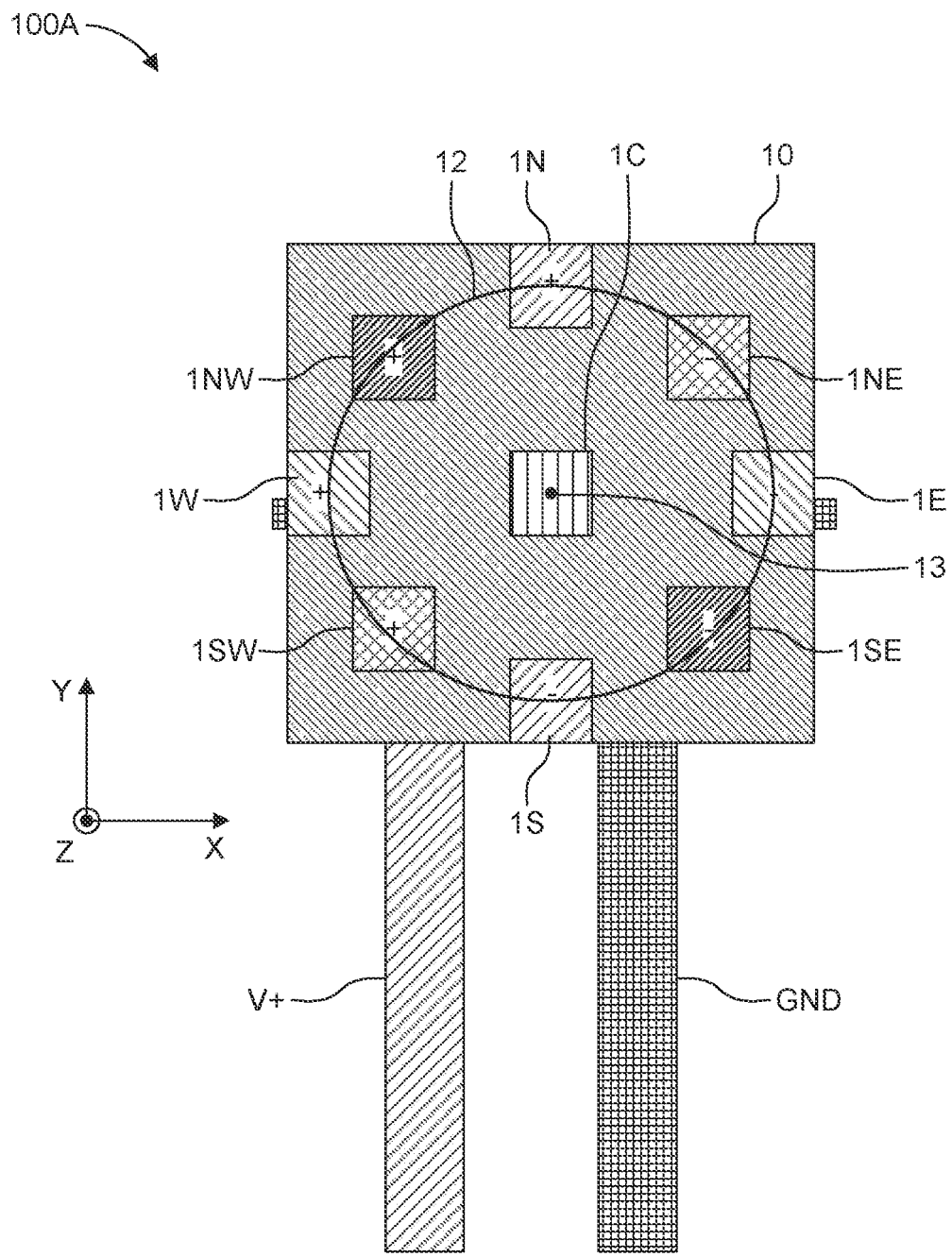
FIGS. 1A and 1B illustrate plan views of two types of magnetic speed sensors according to one or more embodiments.

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise. It is also to be understood that other embodiments may be utilized and structural or logical changes may be made without departing from the scope defined by the claims. The following detailed description, therefore, is not to be taken in a limiting sense.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

Directional terminology, such as "top", "bottom", "above", "below", "front", "back", "behind", "leading", "trailing", "over", "under", etc., may be used with reference to the orientation of the figures and/or elements being described. Because the embodiments can be positioned in a number of different orientations, the directional terminology is used for purposes of illustration and is in no way limiting. In some instances, directional terminology may be exchanged with equivalent directional terminology based on the orientation of an embodiment so long as the general directional relationships between elements, and the general purpose thereof, is maintained.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

The term "substantially" may be used herein to account for small manufacturing tolerances (e.g., within 5%) that are deemed acceptable in the industry without departing from the aspects of the embodiments described herein.

Depending on certain implementation requirements, a storage medium may include a RAM, a ROM, a PROM, an EPROM, an EEPROM, a FLASH memory, or any other medium having electronically readable control signals stored thereon, which cooperate (or are capable of cooperating) with a programmable computer system such that the respective method is performed. Therefore, a storage medium may be regarded as a non-transitory storage medium that is computer readable.

Additionally, instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements. A "controller," including one or more processors, may use electrical signals and digital algorithms to perform its receptive, analytic, and control functions, which may further include corrective functions.

Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a sensor output suitable for processing after conditioning.

Embodiments relate to sensors and sensor systems, and to obtaining information about sensors and sensor systems. A sensor may refer to a component which converts a physical quantity to be measured to an electric signal, for example, a current signal or a voltage signal. The physical quantity may for example comprise a magnetic field, an electric field, a pressure, a force, a current or a voltage, but is not limited thereto. A sensor device, as described herein, may be a speed sensor that measures a rotational speed of an object, such as a toothed wheel.

A magnetic field sensor, for example, includes one or more magnetic field sensor elements that measure one or more characteristics of a magnetic field (e.g., an amount of magnetic field flux density, a field strength, a field angle, a field direction, a field orientation, etc.). The magnetic field may be produced by a magnet, a current-carrying conductor (e.g., a wire), the Earth, or other magnetic field source. Each magnetic field sensor element is configured to generate a sensor signal (e.g., a voltage signal) in response to one or more magnetic fields impinging on the sensor element. Thus, a sensor signal is indicative of the magnitude and/or the orientation of the magnetic field impinging on the sensor element.

Magnetic sensors include magnetoresistive sensors, inductive sensors, and Hall-effect sensors (Hall sensors), for example. Magnetoresistance is a property of a material to change the value of its electrical resistance when an external magnetic field is applied to it. Some examples of magnetoresistive effects are Giant Magneto-Resistance (GMR), which is a quantum mechanical magnetoresistance effect observed in thin-film structures composed of alternating ferromagnetic and non-magnetic conductive layers, Tunnel Magneto-Resistance (TMR), which is a magnetoresistive effect that occurs in a magnetic tunnel junction (MTJ), which is a component consisting of two ferromagnets separated by a thin insulator, or Anisotropic Magneto-Resistance (AMR), which is a property of a material in which a dependence of electrical resistance on the angle between the direction of electric current and direction of magnetization is observed. For example, in the case of AMR sensors, a resistance for an AMR sensor element changes according to a square of a sine of an angle of the magnetic field component projected on a sensing axis of the ARM sensor element.

The plurality of different magnetoresistive effects is commonly abbreviated as xMR, wherein the "x" acts as a placeholder for the various magnetoresistive effects. xMR sensors can detect the orientation of an applied magnetic field by measuring sine and cosine angle components with monolithically integrated magnetoresistive sensor elements.

Magnetoresistive sensor elements of such xMR sensors typically include a plurality of layers, of which at least one layer is a reference layer with a reference magnetization (i.e., a reference direction). The reference magnetization provides a sensing direction corresponding to a sensing axis of the xMR sensor, thereby making the sensor element to a magnetic field component aligned in the sensing direction. A magnetic field component may be, for example, an x-magnetic field component (Bx), a y-magnetic field component (By), or a z-magnetic field component (Bz), where the Bx and By field components are in-plane to the chip, and Bz is out-of-plane to the chip in the examples provided. Accordingly, if a magnetic field component points exactly in the same direction as the reference direction, a resistance of the xMR sensor element is at a maximum, and, if a magnetic field component points exactly in the opposite direction as the reference direction, the resistance of the xMR sensor element is at a minimum.

In some applications, an xMR sensor includes a plurality of magnetoresistive sensor elements, which have the same or different reference magnetizations. Examples of such applications, in which various reference magnetizations are used, are angle sensors, compass sensors, or specific types of speed sensors (e.g., speed sensors in a bridge arrangement referred to as monocells).

By way of example, such magnetoresistive sensor elements are used in speed, angle, or rotational speed measuring apparatuses, in which magnets may be moved relative to an magnetoresistive sensor elements and hence the magnetic field at the location of the magnetoresistive sensor element changes in the case of movement, which, in turn, leads to a measurable change in resistance. For the purposes of an angle sensor, a magnet or a magnet arrangement may be applied to a rotatable shaft and an xMR sensor may be arranged stationary in relation thereto.

A Hall effect sensor is a transducer that varies its output voltage (Hall voltage) in response to a magnetic field. It is based on the Hall effect which makes use of the Lorentz force. The Lorentz force deflects moving charges in the presence of a magnetic field which is perpendicular to the current flow through the sensor or Hall plate. Thereby, a Hall plate can be a thin piece of semiconductor or metal. The deflection causes a charge separation which causes a Hall electrical field. This electrical field acts on the charge in the opposite direction with regard to the Lorentz Force. Both forces balance each other and create a potential difference perpendicular to the direction of current flow. The potential difference can be measured as a Hall voltage and varies in a linear relationship with the magnetic field for small values. Hall effect sensors can be used for proximity switching, positioning, speed detection, and current sensing applications.

A vertical Hall sensor is a magnetic field sensor constructed with the Hall element perpendicular to the plane of the sensor chip (e.g., extending from a main surface of the chip into the chip body). It senses magnetic fields perpendicular to its defined sensitive edge (top, right, or left, relative to the main surface of the chip). This generally means that a vertical Hall sensor is sensitive to a magnetic field component that extends parallel to their surface and parallel, or in-plane, to the main surface of the chip in which the vertical Hall sensor is integrated. In particular, a vertical Hall sensor may extend from the main surface vertically into the chip (e.g., into a semiconductor substrate). The plane of sensitivity may be referred to herein as a "sensitivity-axis" or "sensing axis" and each sensing axis has a reference direction. For vertical Hall sensor elements, voltage values output by the sensor elements change according to the magnetic field strength in the direction of its sensing axis. For the purposes of this disclosure, a main surface of the sensor chip is defined in the XY plane and a vertical Hall sensor is sensitive to a field in the XY plane (e.g., in the X direction, Y direction, or a direction therebetween).

On the other hand, a lateral (planar) Hall sensor is constructed with the Hall element in the same plane as the main surface of the sensor chip. It senses magnetic fields perpendicular to its planar surface. This means they are sensitive to magnetic fields vertical, or out-of-plane, to the main surface of the chip. The plane of sensitivity may be referred to herein as a "sensitivity-axis" or "sensing axis" and each sensing axis has a reference direction. Similar to vertical Hall sensor elements, voltage values output by lateral Hall sensor elements change according to the magnetic field strength in the direction of its sensing axis. For the purposes of this disclosure, a main surface of the sensor chip is defined in the XY plane and a lateral Hall sensor is sensitive to a field aligned in a Z direction that is perpendicular to the XY plane.

According to one or more embodiments, a plurality of magnetic field sensors and a sensor circuitry may be both accommodated (i.e., integrated) in the same chip. The sensor circuit may be referred to as a signal processing circuit and/or a signal conditioning circuit that receives one or more signals (i.e., sensor signals) from one or more magnetic field sensor elements in the form of raw measurement data and derives, from the sensor signal, a measurement signal that represents the magnetic field.

In some cases, a measurement signal may be differential measurement signal that is derived from sensor signals generated by two sensor elements having a same sensing axis (e.g., two sensor elements sensitive to the same magnetic field component) using differential calculus. A differential measurement signal provides robustness to homogenous external stray magnetic fields.

Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a sensor output suitable for processing after conditioning.

Thus, the sensor circuit may include an analog-to-digital converter (ADC) that converts the analog signal from the one or more sensor elements to a digital signal. The sensor circuit may also include a DSP that performs some processing on the digital signal, to be discussed below. Therefore, a chip, which may also be referred to as an integrated circuit (IC), may include a circuit that conditions and amplifies the small signal of one or more magnetic field sensor elements via signal processing and/or conditioning.

A sensor device, as used herein, may refer to a device which includes a sensor and sensor circuit as described above. A sensor device may be integrated on a single semiconductor die (e.g., silicon die or chip). Thus, the sensor and the sensor circuit are disposed on the same semiconductor die.

Figure 1B:
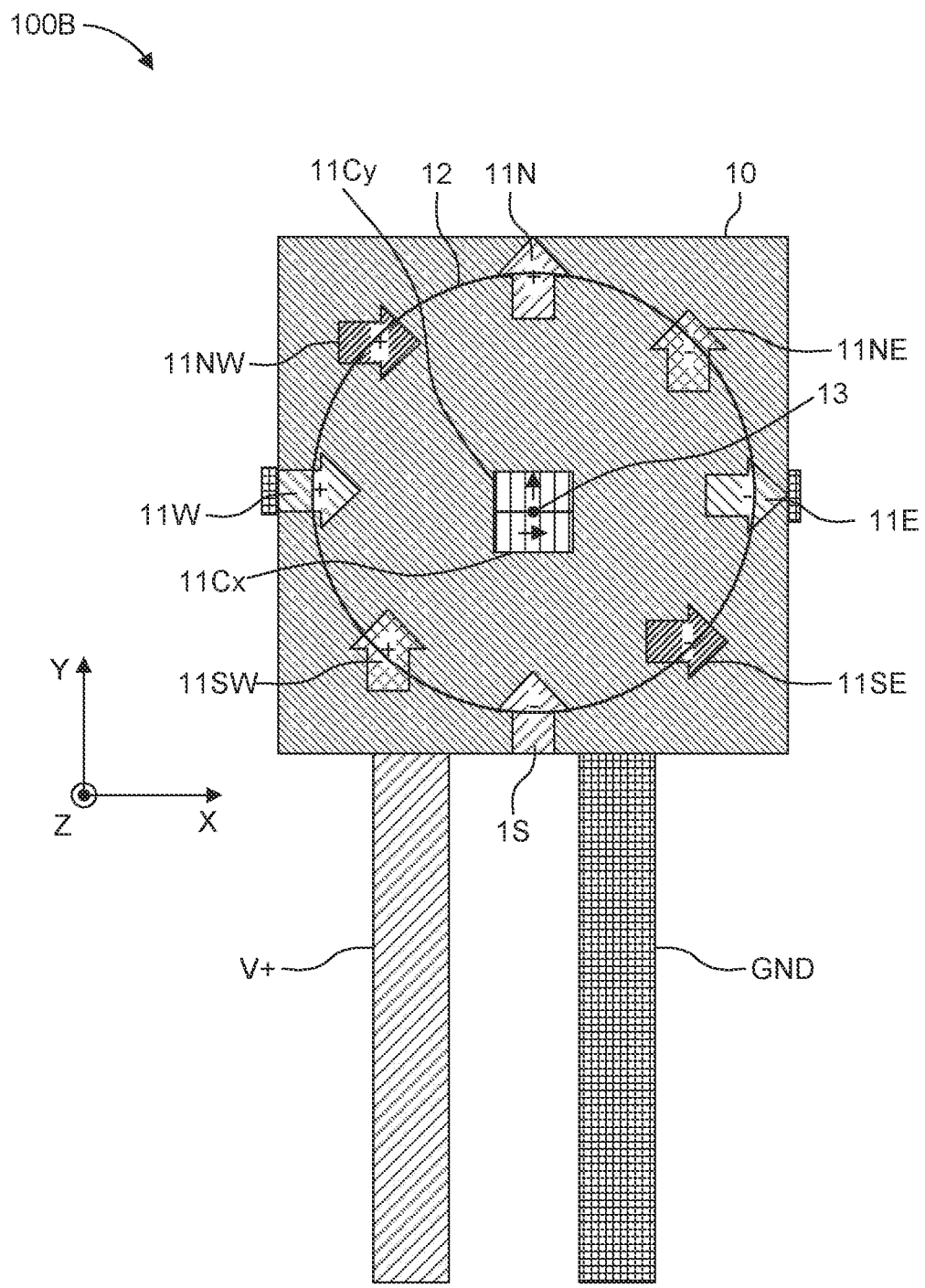

FIGS. 1A and 1B illustrate plan views of magnetic speed sensors 100A and 100B, respectively, according to one or more embodiments. In particular, magnetic speed sensor 100A includes magnetic field sensor elements 1 that are sensitive to an out-of-plane magnetic field component (i.e., a magnetic field aligned in a Z direction that is perpendicular to the XY plane of the sensor chip 10). In other words, the sensor elements 1 are lateral Hall sensor elements that are sensitive to a Bz magnetic field component. In contrast, the magnetic speed sensor 100B includes magnetic field sensor elements 11 that are sensitive to an in-plane magnetic field component (e.g., a magnetic field aligned in either an X direction or a Y direction that is parallel to the XY plane of the sensor chip 10). In other words, the sensor elements 11 are either vertical Hall sensor elements or xMR sensor elements that are sensitive to an in-plane magnetic field component, such as Bx or By magnetic field components.

Turning to FIG. 1A, the sensor elements 1 include sensor elements 1N, 1NE, 1E, 1SE, 1S, 1SW, 1W, and 1NW arranged equidistant from each other on a circle 12. The sensor elements 1N, 1NE, 1E, 1SE, 1S, 1SW, 1W, and 1NW are arranged on a circumference of the circle 12 with equidistant spacing from each other. Thus, the sensor elements 1 are spatially distributed equally about a center axis 13 of the circle 12 such that all sensor elements 1 are exposed to substantially the same (due to typical assembly tolerances of 3%), or exactly the same magnetic field working point. Here, the sensor elements 1N, 1NE, 1E, 1S, 1SE, 1SW, 1W, and 1NW are arranged 22.5° from each other.

The sensor elements 1 further include a center sensor element 1C arranged at the center of the circle 12, centered on the center axis 13, or proximate thereto. Sensor elements 1N, 1NE, 1E, 1SE, 1S, 1SW, 1W, 1NW, and 1C may collectively be referred to as sensor elements 1 when generally referring to the sensor elements of the magnetic speed sensor 100A. The sensor elements 1 have their sensing axes aligned in (parallel to) the z-direction for sensing Bz magnetic field components.

The sensor elements 1N, 1NE, 1E, 1SE, 1S, 1SW, 1W, and 1NW are further grouped into different, mutually exclusive differential pairs, with those sensor elements arranged opposite to each other across the circle 12 forming a differential pair. Thus, four differential pairs are shown, including: a first pair of sensor elements 1N and 1S, a second pair of sensor elements 1E and 1W, a third pair of sensor elements 1NE and 1SW, and a fourth pair of sensor elements 1NW and 1SE. The more differential pairs that are provided, the better the performance of the sensor. For example, more differential pairs means higher resolution and better accuracy for speed sensing and direction of rotation detection to be discussed in further detail below.

While four differential pairs are shown, only two pairs that are arranged perpendicular to each other are required. For example, two pairs may include the first pair and the second pair because a line extending through the center axis 13 and the first pair is perpendicular to a line that extends through the center axis 13 and the second pair. Likewise, the two pairs may include the third pair and the fourth pair because a line extending through the center axis 13 and the third pair is perpendicular to a line that extends through the center axis 13 and the fourth pair. Additional differential pairs may be added to the minimum number of two pairs to enhance the performance of the sensor.

The sensor chip 10 may be a semiconductor substrate that also includes additional circuitry for processing sensor signals generated by the sensor elements 1. The magnetic speed sensor 100A also includes power supply pins, V+ and GND, that supply power to the sensor chip 10 and its components.

The sensor signals of each sensor element 1 is provided to the sensor circuit 20 (not illustrated) that generates or calculates a speed measurement signal for each differential pair using a differential calculation that cancels out the homogeneous stray-fields. Thus, each speed measurement signal is a differential signal calculated from two sensor signals. For example, the following speed measurement signals may be calculated based on sensor signals output by each sensor element 1:

$$V_{speed1} = V_{1W} - V_{1E} \qquad (1),$$

$$V_{speed2} = V_{1N} - V_{1S} \qquad (2),$$

$$V_{speed3} = V_{1SW} - V_{1NE} \qquad (3), \text{ and}$$

$$V_{speed4} = V_{1NW} - V_{1SE} \qquad (4).$$

Each voltage value $V_{1N}$, $V_{1NE}$, $V_{1E}$, $V_{1SE}$, $V_{1S}$, $V_{1SW}$, $V_{1W}$, and $V_{1NW}$ represents a sensor signal from a respective sensor element 1N, 1NE, 1E, 1SE, 1S, 1SW, 1W, and 1NW. If xMR sensors are used, sensor signals may be represented as resistance values in a similar manner.

The sensor circuit 20 is further configured to analyze the magnitude of each speed measurement signal ($V_{speed1}$, $V_{speed2}$, $V_{speed3}$, and $V_{speed4}$) in real-time and determine which of the speed measurement signals has the largest magnitude (or amplitude irrespective of sign). At any given moment, the sensor circuit 20 selects the speed measurement signal that has the largest magnitude to use as selected speed measurement signal to be used for generating output signals.

The other unselected speed measurement signals are not used for generating output signals and, in this sense, are disregarded by the sensor circuit 20.

Any time one speed measurement signal becomes the signal of greatest magnitude, that speed measurement signal is selected for output. This means the sensor circuit 20 continuously monitors the magnitudes of each of the speed measurement signals via comparing them against each other and may dynamically switch between the speed measurement signals as one becomes the signal of greatest magnitude. If two speed measurement signals are equal in magnitude, the sensor circuit 20 selects one of them. The sensor circuit 20 may use multiple channels and a multiplexer for selectively outputting the selected speed measurement signal.

The magnitude of each of the speed measurement signals may change based on the twist orientation and specifically the twist rotation of the sensor 100A about the central axis 13 relative to a reference direction or reference axis. For example, a tangent of a target wheel at a point of tangency may be parallel to one axis (e.g., the x-axis) of the sensor plane. The point of tangency is the point having the minimum distance (minimum air gap) between the sensor chip 10 and the target wheel. It is along this reference axis that the sensed magnetic field in the sensing direction will have the largest peak-to-peak variance and thus largest magnitude as the target wheel rotates. Thus, a differential pair most closely aligned along the reference axis will provide the best speed measurement signal to be used for generating output signals.

Speed measurement signals represent a rotational speed of a target object, such as a tooth wheel or magnetic pole wheel made of alternating north and south poles. The center sensor element 1C may also generate a sensor signal Sdir that is used as a direction signal. The direction signal relative to the speed measurement signal represents the rotational direction of the movement of the target object (e.g., clockwise or counterclockwise rotation). In particular, the direction signal has a phase shift relative to the speed measurement signals and sign of the phase shift (i.e., either a positive phase shift or a negative phase shift) is indicative of the rotational direction of the target object.

In particular, the phase shift may be positive or negative 90 degrees, but is not necessarily limited thereto. The direction signal may be a phase-shifted replica of the speed measurement signals having a same oscillation frequency, although with a smaller amplitude as it is generated by a monocell sensor element. As such, it is conceivable that a speed signal may be used as a direction signal and vice versa through amplification and signal processing.

The sensor circuit 20 may be configured to evaluate the phase shift between a selected speed measurement signal and a corresponding direction signal each time the selected speed measurement signal crosses one or more switching thresholds on a rising transition, a falling transition, or both. The crossing of a switching threshold is treated as a sampling time that triggers the evaluation. In other words, the evaluation is done periodically to determine the rotation direction of the target object.

Alternatively, the sensor circuit 20 may use a coordinate rotation digital computer (CORDIC) algorithm on the differential signals coming out from two orthogonal differential pairs to determine the rotation direction of the target wheel. One of the two orthogonal differential pairs that corresponds to the selected speed measurement signal would be selected by the sensor circuit 20 and the other differential pair would be the pair orthogonal thereto.

Accordingly, the sensor circuit 20 can evaluate the selected speed measurement signal along with the direction signal generated by sensor element 1C to determine the rotational direction of the target object.

Depending on which speed measurement signal is determined as the signal of greatest magnitude, the sensor circuit 20 can also determine the twist orientation and specifically the twist rotation of the sensor 100A about the central axis 13. This rotational value in degrees may also be referred to as the twist rotation of the sensor 100A.

For example, the sensor circuit 20 can further use the speed measurement signal determined as the signal of greatest magnitude (i.e., the selected speed measurement signal) to determine the twist rotation of the sensor 100A relative to a reference position of zero degrees. For example, each differential pair of sensor elements may have a position mapped to a respective twist rotation angle. The differential pair that generates the differential signal (speed measurement signal) of greatest magnitude is most closely aligned, if not entirely aligned, with a reference axis (e.g., the x-axis) and is indicative of the twist rotation angle of the sensor 100B. If two speed measurement signals are equal in magnitude, the sensor circuit 20 can also determine a twist rotation angle based on which two speed measurement signals are equal in magnitude and their signs (positive or negative).

For example, FIG. 2 shows a table that provides a twist direction and angle algorithm summary utilized by the sensor circuit 20 according to one or more embodiments. In the table shown in FIG. 2, the grey cells are those referring to "dominant" differential pairs (i.e., the sensing element pairs with the largest magnitude). Twist angle assignments are also shown for situations in which two dominant differential pairs (i.e., the sensing element pairs with the equal largest magnitudes) are present. A twist direction is also assigned with a positive twist direction being assigned for twist angles from 270 to 90 degrees and a negative twist direction being assigned for twist angles from 90 to 270 degrees.

In addition, specific values of the speed measurement signal of greatest magnitude may be mapped to analog or discrete twist angular values. Accordingly, each speed measurement signal may cover a range of twist angular values that the sensor circuit 20 can discriminate.

By determining the twist angle, sensor 100A can be used as an angle sensor.

Turning to FIG. 1B, the sensor elements 11 include sensor elements 11N, 11NE, 11E, 11SE, 11S, 11SW, 11W, and 11NW arranged equidistant from each other on a circle 12. The sensor elements 11N, 11NE, 11E, 11SE, 11S, 11SW, 11W, and 11NW are arranged on a circumference of the circle 12 with equidistant spacing from each other. Thus, the sensor elements 11 are spatially distributed equally about a center axis 13 of the circle 12 such that all sensor elements 11 are exposed to substantially the same (due to typical assembly tolerances of 3%), or exactly the same magnetic field working point. Here, the sensor elements 11N, 11NE, 11E, 11S, 11SE, 11SW, 11W, and 11NW are arranged 22.5° from each other.

The sensor elements 11 further include a sensor elements 11Cx and 11Cy arranged at the center of the circle 12 or proximate thereto. Sensor elements 11N, 11NE, 11E, 11SE, 11S, 11SW, 11W, 11NW, 11Cx, and 11Cy may collectively be referred to as sensor elements 11 when generally referring to the sensor elements of the magnetic speed sensor 100B.

The sensor elements 11 each have a sensing axis utilized for the speed sensor that is aligned with one of the in-plane magnetic field components Bx or By. The arrows on each sensor element 11 indicate a sensing direction of a sensor element 11. The sensing direction for sensor elements 11N, 11S, 11NE, 11SW, and 11Cy are the same. The sensing direction for sensor elements 11E, 11W, 11NW, 11SE, and 11Cx are the same. In particular, according to this example, oppositely disposed sensor elements 11E and 11W, may have a sensing axis in the x-direction configured for sensing the in-plane magnetic field component Bx (i.e., sensitive to magnetic fields in the x-plane). Similarly, oppositely disposed sensor elements 11N and 11S may have a sensing axis in the y-direction configured for sensing the in-plane magnetic field component By (i.e., sensitive to magnetic fields in the y-plane).

If the sensor elements 11 are xMR sensors, each sensor element 11 has a reference layer whose reference direction defines its sensing axis (i.e., its sensing direction). Thus, if the magnetic field points exactly in the same direction as the reference direction, the resistance of the xMR sensor element is at a maximum, and, if the magnetic field points exactly in the opposite direction as the reference direction, the resistance of the xMR sensor element is at a minimum.

The sensor elements 11N, 11NE, 11E, 11SE, 11S, 11SW, 11W, and 11NW are further grouped into different, mutually exclusive differential pairs, with those sensor elements arranged opposite to each other across the circle 12 forming a differential pair. Thus, four differential pairs are shown, including: a first pair of sensor elements 11N and 11S, a second pair of sensor elements 11E and 11W, a third pair of sensor elements 11NE and 11SW, and a fourth pair of sensor elements 11NW and 11SE. The more differential pairs that are provided, the better the performance of the sensor. For example, more differential pairs means higher resolution and better accuracy for direction of rotation detection to be discussed in further detail below.

While four differential pairs are shown, only two pairs are required. The two pairs may be arranged perpendicular to each other. For example, two pairs may include the first pair and the second pair because a line extending through the center axis 13 and the first pair is perpendicular to a line that extends through the center axis 13 and the second pair. Likewise, the two pairs may include the third pair and the fourth pair because a line extending through the center axis 13 and the third pair is perpendicular to a line that extends through the center axis 13 and the fourth pair.

The sensor signals of each sensor element 11 is provided to the sensor circuit 20 (not illustrated) that generates or calculates a speed measurement signal for each differential pair using a differential calculation that cancels out the homogeneous stray-fields in the x and y-directions, and out-of-plane magnetic field components do not affect the output signal (i.e., the sensor output). Thus, each speed measurement signal is a differential signal calculated from two sensor signals. For example, the following speed measurement signals may be calculated based on xMR sensor signals output by each sensor element 11:

$$R_{speed1} = R_{11W} - R_{11E} \quad (5),$$

$$R_{speed2} = R_{11N} - R_{11S} \quad (6),$$

$$R_{speed3} = R_{11SW} - R_{11NE} \quad (7), \text{ and}$$

$$R_{speed4} = R_{11NW} - R_{11SE} \quad (8).$$

Each resistance value $R_{11N}$, $R_{11NE}$, $R_{11E}$, $R_{11SE}$, $R_{11S}$, $R_{11SW}$, $R_{11W}$, and $R_{11NW}$ represents a sensor signal from a respective sensor element 11N, 11NE, 11E, 11SE, 11S, 11SW, 11W, and 11NW, respectively. Alternatively, each of the differential pairs may be arranged in a separate bridge circuit along with two known resistors. The output of each bridge circuit is a differential voltage value that may be used as a respective speed measurement signal $V_{speed1}$, $V_{speed2}$, $V_{speed3}$, or $V_{speed4}$.

If Hall sensor elements are used as sensor elements 11, equations 1-4 may be used for calculating the speed measurement signals.

The sensor circuit 20 is further configured to analyze the magnitude of each speed measurement signal ($R_{speed1}$, $R_{speed2}$, $R_{speed3}$, and $R_{speed4}$ or $V_{speed1}$, $V_{speed2}$, $V_{speed3}$, and $V_{speed4}$) in real-time and determine which of the speed measurement signals has the largest magnitude (or amplitude irrespective of sign). At any given moment, the sensor circuit 20 selects the speed measurement signal that has the largest magnitude to use as selected speed measurement signal to be used for generating output signals. The other unselected speed measurement signals are not used for generating output signals and, in this sense, are disregarded by the sensor circuit 20.

Any time one speed measurement signal becomes the signal of greatest magnitude, that speed measurement signal is selected for output. This means the sensor circuit 20 continuously monitors the magnitudes of each of the speed measurement signals via comparing them against each other and may dynamically switch between the speed measurement signals as one becomes the signal of greatest magnitude. If two speed measurement signals are equal in magnitude, the sensor circuit 20 selects one of them. The sensor circuit 20 may use multiple channels and a multiplexer for selectively outputting the selected speed measurement signal.

The magnitude of each of the speed measurement signals may change based on the twist orientation and specifically the twist rotation of the sensor 100B about the central axis 13 relative to a reference direction or reference axis. For example, a tangent of a target wheel at a point of tangency may be parallel to one axis (e.g., the x-axis) of the sensor plane. The point of tangency is the point having the minimum distance (minimum air gap) between the sensor chip 10 and the target wheel. It is along this reference axis that the sensed magnetic field in the sensing direction will have the largest peak-to-peak variance and thus largest magnitude as the target wheel rotates. Thus, a differential pair most closely aligned along the reference axis will provide the best speed measurement signal to be used for generating output signals.

Speed measurement signals represent a rotational speed of a target object, such as a tooth wheel or magnetic pole wheel made of alternating north and south poles. The center sensor elements 11Cx and 11Cy may also generate a sensor signals Sdir that are used as a direction signal. The direction signal relative to the speed measurement signal represents the rotational direction of the movement of the target object (e.g., clockwise or counterclockwise rotation). The direction signal has a phase shift relative to the speed measurement signals and sign of the phase shift (i.e., either a positive phase shift or a negative phase shift) is indicative of the rotational direction of the target object.

In particular, the phase shift may be positive or negative 90 degrees, but is not necessarily limited thereto. The direction signal may be a phase-shifted replica of the speed measurement signals, although with a smaller amplitude as it is generated by a monocell sensor element. As such, the direction signal Sdir is selected from the sensor outputs of center sensor elements 11Cx and 11Cy based on which differential pair is selected for output of the speed measurement signal. If a differential pair sensing the Bx magnetic field component is selected as having the signal of greatest magnitude, then the output of center sensor element 11Cx is selected by the sensor circuit 20 as the useful direction signal. In contrast, if a differential pair sensing the By magnetic field component is selected as having the signal of greatest magnitude, then the output of center sensor element 11Cy is selected by the sensor circuit 20 as the useful direction signal. This ensures that the direction signal is a phase-shifted replica of the selected speed measurement signal.

The sensor circuit 20 may evaluate the selected speed measurement signal along with the selected direction signal to determine the rotational direction of the target object as similarly described above.

Depending on which speed measurement signal is determined as the signal of greatest magnitude, the sensor circuit 20 can also determine the twist orientation and specifically the twist rotation of the sensor 100A about the central axis 13. This rotational value in degrees may also be referred to as the twist rotation of the sensor 100B.

For example, the sensor circuit 20 further uses the speed measurement signal determined as the signal of greatest magnitude (i.e., the selected speed measurement signal) to determine the twist rotation of the sensor 100B relative to a reference position of zero degrees. For example, each differential pair of sensor elements may have a position mapped to a respective twist rotation angle. The differential pair that generates the differential signal (speed measurement signal) of greatest magnitude is most closely aligned, if not entirely aligned, with a reference axis (e.g., the x-axis) and is indicative of the twist rotation angle of the sensor 100B. If two speed measurement signals are equal in magnitude, the sensor circuit 20 can also determine a twist rotation angle based on which two speed measurement signals are equal in magnitude and their signs (positive or negative).

For example, FIG. 2 shows a table that provides a twist direction and angle algorithm summary. In the table shown in FIG. 2, the grey cells are those referring to "dominant" differential pairs (i.e., the sensing element pairs with the largest magnitude). Twist angle assignments are also shown for situations in which two dominant differential pairs (i.e., the sensing element pairs with the equal largest magnitudes) are present. A twist direction is also assigned with a positive twist direction being assigned for twist angles from 270 to 90 degrees and a negative twist direction being assigned for twist angles from 90 to 270 degrees.

In addition, specific values of the speed measurement signal of greatest magnitude may be mapped to analog or discrete twist angular values. Accordingly, each speed measurement signal may cover a range of twist angular values that the sensor circuit 20 can discriminate.

By determining the twist angle, sensor 100B can be used as an angle sensor.

Figure 3:
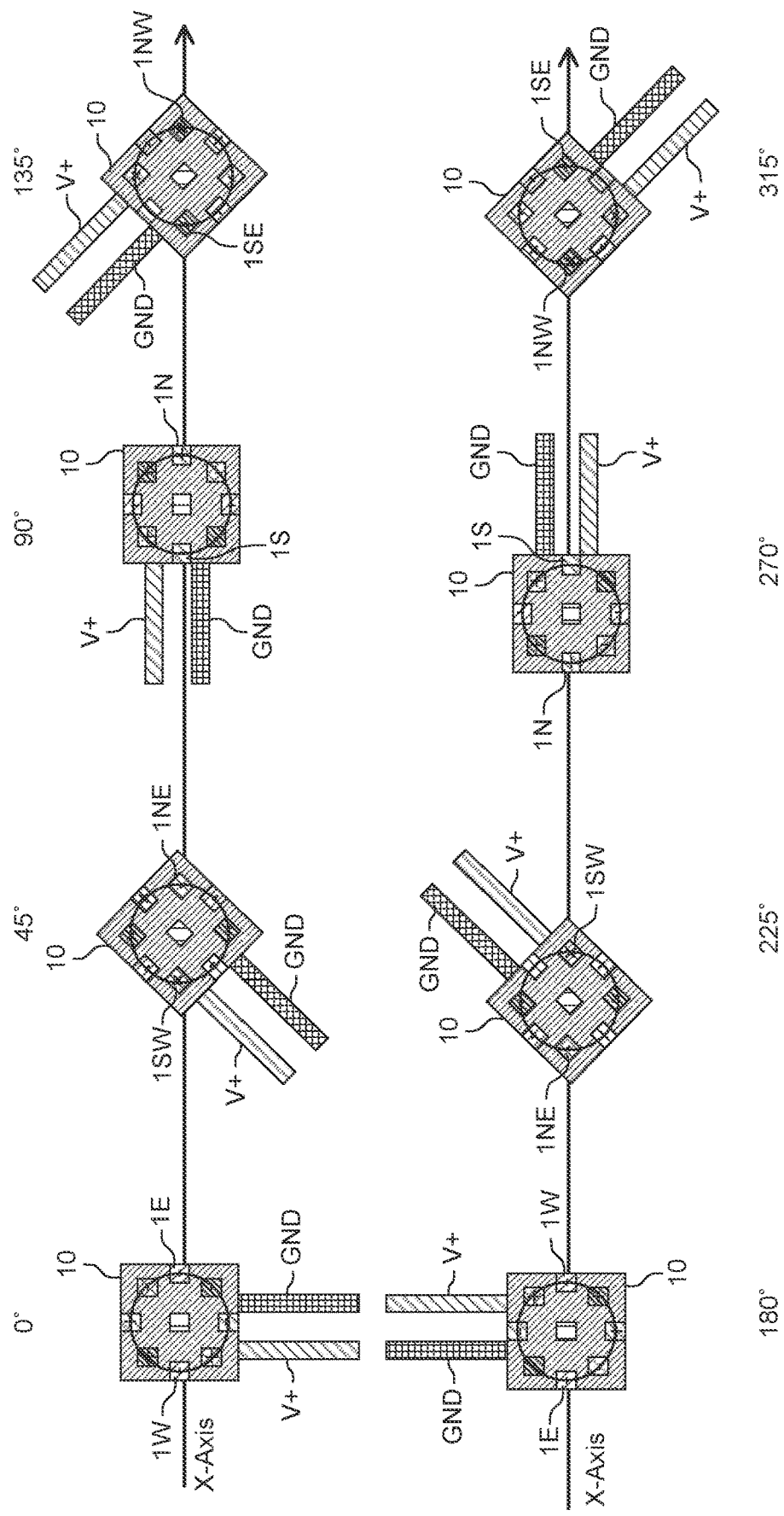
FIG. 3 shows various twist angle orientations of a magnetic speed sensor according to one or more embodiments.

FIG. 3 shows various twist angle orientations of magnetic speed sensor 100A according to one or more embodiments. Similar twist angle orientations and results would similarly apply to magnetic speed sensor 100B. Here, the x-axis is the reference axis (direction) and the magnetic speed sensor at 0° corresponds to the reference position. For simplicity, only the dominant sensor element pairs are labeled. A differential pair is a dominant pair when it is aligned (or most closely aligned) with the reference axis.

When sensor elements 1E and 1W are the dominant differential pair (i.e., the sensing element pairs with the largest magnitude) and their speed measurement signal is positive, a twist angle of 0° is determined. In contrast, when sensor elements 1E and 1W are the dominant differential pair (i.e., the sensing element pairs with the largest magnitude) and their speed measurement signal is negative, a twist angle of 180° is determined.

When sensor elements 1NE and 1SW are the dominant differential pair (i.e., the sensing element pairs with the largest magnitude) and their speed measurement signal is positive, a twist angle of 45° is determined. In contrast, when sensor elements 1NE and 1SW are the dominant differential pair (i.e., the sensing element pairs with the largest magnitude) and their speed measurement signal is negative, a twist angle of 225° is determined.

When sensor elements 1N and 1S are the dominant differential pair (i.e., the sensing element pairs with the largest magnitude) and their speed measurement signal is negative, a twist angle of 90° is determined. In contrast, when sensor elements 1N and 1S are the dominant differential pair (i.e., the sensing element pairs with the largest magnitude) and their speed measurement signal is positive, a twist angle of 270° is determined.

When sensor elements 1NW and 1SE are the dominant differential pair (i.e., the sensing element pairs with the largest magnitude) and their speed measurement signal is negative, a twist angle of 135° is determined. In contrast, when sensor elements 1NW and 1SE are the dominant differential pair (i.e., the sensing element pairs with the largest magnitude) and their speed measurement signal is positive, a twist angle of 315° is determined.

Additional twist angles can be gleaned from the table shown in FIG. 2.

Figure 4:
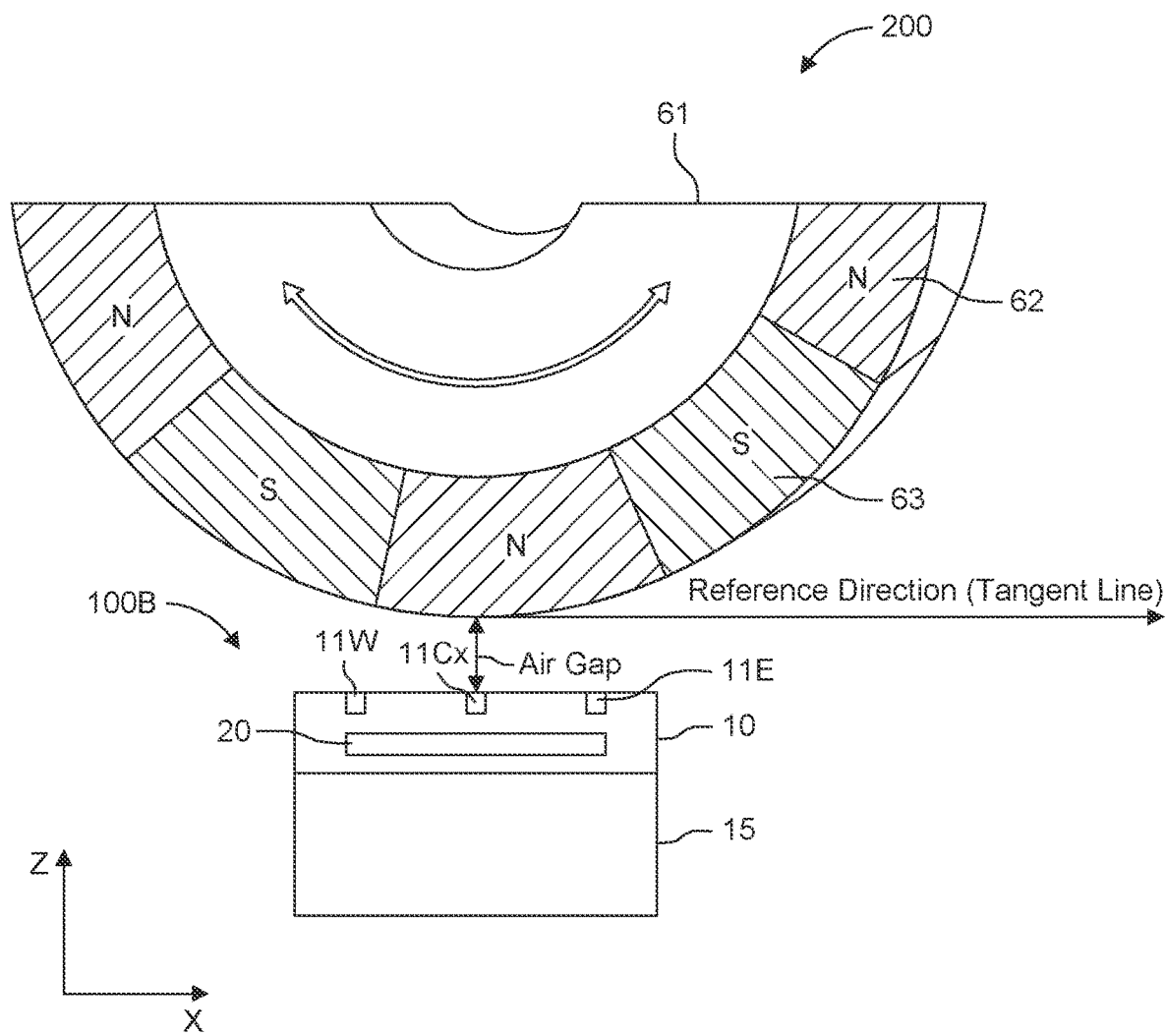
FIG. 4 illustrates a cross-sectional view of a sensor system according to one or more embodiments.

FIG. 4 illustrates a cross-sectional view of a sensor system 200 according to one or more embodiments. In particular, FIG. 4 shows a sensor system 200 that includes a magnetized encoder wheel (i.e., a pole wheel) 61 as a target object comprised of alternating north pole sections 62 and south pole sections 63. The target object could also be a toothed wheel. Accordingly, the north pole sections 62 and south pole sections 63 represent teeth and notches of a tooth and notch wheel. Here, the magnetic speed sensor 100B is shown with the sensor chip 10 being on a back bias magnet 15 and having an air gap from the wheel 61. The back bias magnet 14 is an axially polarized back bias magnet, such as a cylinder or pellet, that creates a radially symmetric bias magnetic field in a sensor plane, wherein the radially symmetric bias magnetic field is zero at a center axis 13 of the axially polarized back bias magnet and increases in a radial direction in the sensor plane from the center axis 13.

The sensor elements 11 are sensitive to the radial magnetic fields of the back bias magnet 15 that are influenced by the north pole sections 62 and south pole sections 63 of the wheel 61. Also, the sensor circuit 20 of magnetic speed sensor 100B is shown. The sensor circuit 20 generates sensor outputs that corresponds to the rotational speed of the wheel 61 and the rotational direction of the wheel 61 by detecting the change of the alternating magnetic field. The sensor circuit 20 may also output a twist angle signal that indicates the twist angle of the sensor chip 10 relative to a reference axis or reference direction.

The sensor circuit 20 may transmit the sensor output signals to an external processor or controller unit, such as an ECU for speed calculation and determination, which in turn may provide a speed measurement to a user or other processing or output component, such as a display.

Figure 5:
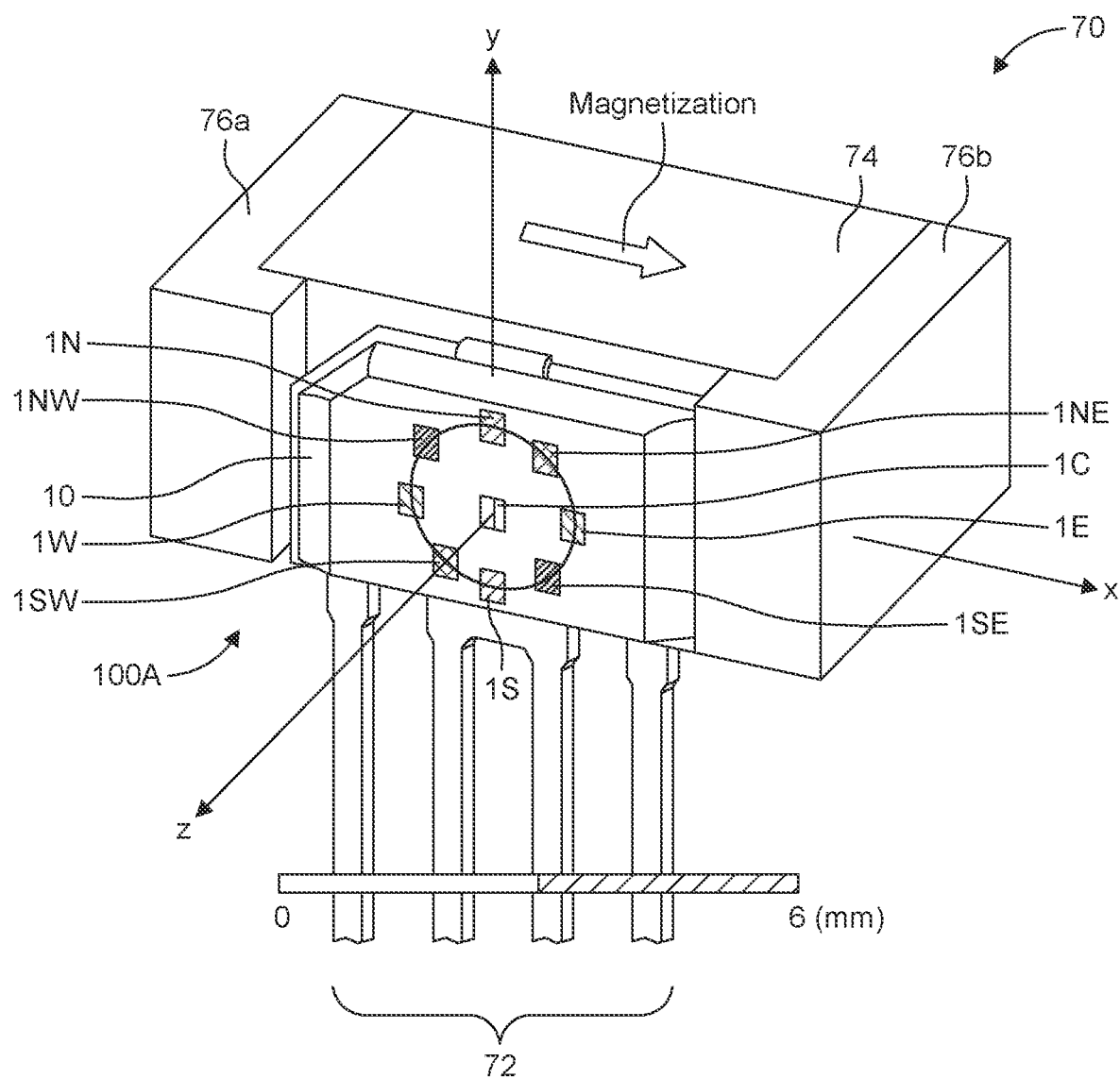
FIG. 5 illustrates a sensor module according to one or more embodiments.

FIG. 5 illustrates a sensor module 70 according to one or more embodiments. In particular, FIG. 5 shows magnetic speed sensor 100A comprising lateral Hall sensor elements 1, and a magnetic back bias circuit 74 that enables twist-insensitive and stray-field robust sensing of the target wheel (e.g., a toothed wheel or a magnetized encoder wheel).

The sensor module 70 includes a sensor chip 71 with lead frame 72 extending therefrom, a back bias magnet 74 located on a back side of the sensor chip 10 and magnetized in the (in-plane) x-direction, a first magnetic flux guide 76a, and a second magnetic flux guide 76b.

The sensor chip 10 includes a sensor elements (e.g., Hall plates) 1N, 1NE, 1E, 1SE, 1S, 1SW, 1W, 1NW, and 1C that their sensitivity-axes aligned parallel to the z-axis, which is an out-of-plane component of the sensor chip 10 and are sensitive to magnetic field component Bz (i.e., the magnetic field in the z-plane). Here, a back side of the sensor chip 10 refers to the side that is furthest from the target wheel and a front side of the sensor chip 10 faces the target wheel in the z-direction.

The back bias magnet 74 is magnetized in the x-direction, parallel to the in-plane component of the sensor chip 71. The back bias magnet 74 may be, for example, a block or cylinder magnet placed between the a first magnetic flux guide 76a, and a second magnetic flux guide 76b, and coupled to the back side of the sensor chip 71.

Figure 6:
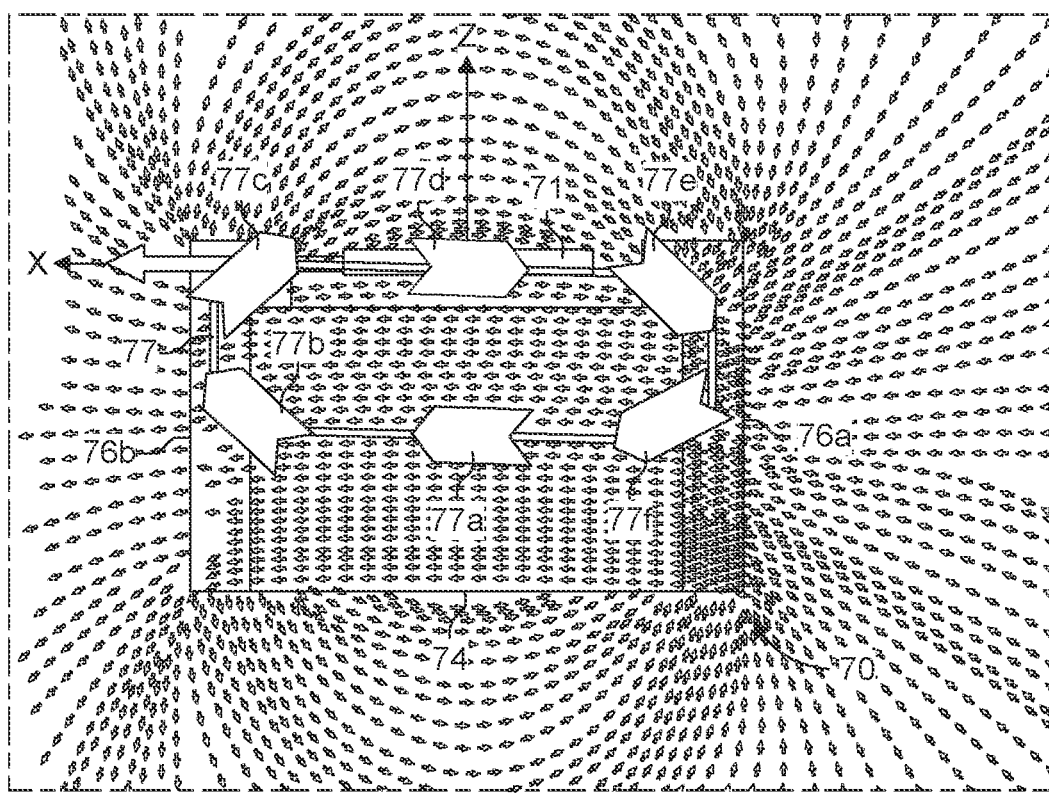
FIG. 6 illustrates a plan view of the sensor module of FIG. 5 and showing magnetic field patterns coupled in a loop in an environment around the sensor module according to one or more embodiments.

The first magnetic flux guide 76a and the second magnetic flux guide 76b are located at opposite poles of the magnet 74 and made of a material (e.g., iron) capable of redirecting the magnetic field produced by the magnet 74. In particular, FIG. 6 illustrates a plan view of the sensor module 70 showing magnetic field patterns coupled in a loop 77 in the environment around the sensor module 70. As the magnet 74 is magnetized in the x-direction, the magnetic B-field (flux lines) starts in an x-direction at point 77a, a portion of the magnetic B-field is redirected by the second magnetic flux guide 76b at points 77b and 77c such that the magnet B-field is directed, anti-parallel to the x-direction, through the (in-plane) x-plane of the sensor package 71 at point 77d, and a portion of the magnetic B-field is redirected again by the first magnetic flux guide 76a at points 77e and 77f such that the magnet B-field is directed back in the x-direction.

In absence of the ferrous target wheel (or in front of a notch), the magnetic B-field will exit from the second magnetic flux guide 76b and directly couple into the first magnetic flux guide 76a again. Thus, there is a strong negative Bx-field and almost no Bz or By field at the sensor location (i.e., at the sensor elements 1). Thus, the Bz-sensitive Hall plates are exposed to low Bz-fields, with a small offset.

Conversely, in the presence of the wheel (or in front of a tooth), the magnetic field will be pulled in z-threction towards the target wheel. The Bz-field on, for example, sensor element 1W and sensor element 1E increases with opposite sign due to the increase in Bz-field strength.

Figure 7:
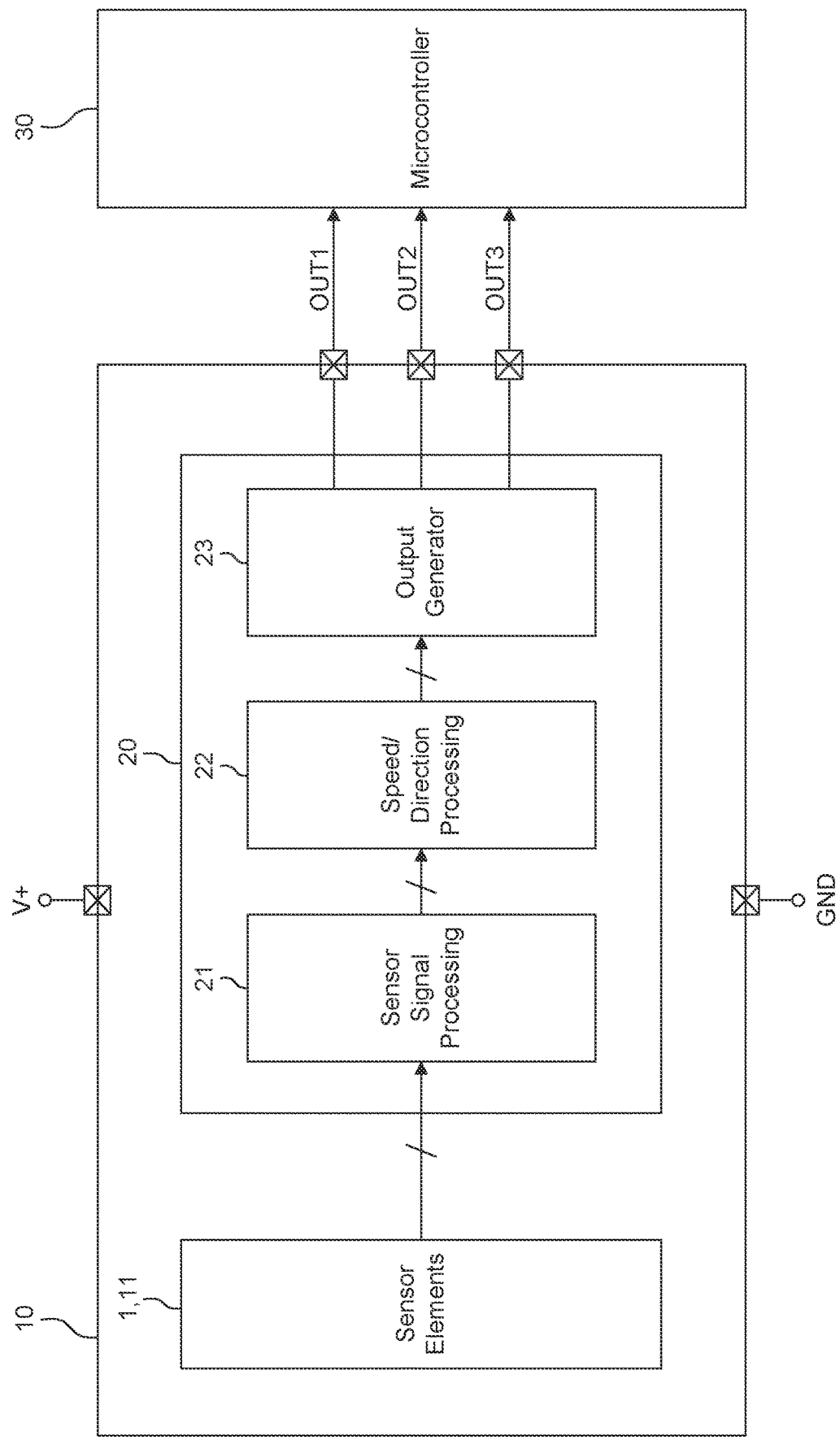
FIG. 7 is a schematic block diagram of a sensor system including a speed magnetic sensor according to one or more embodiments.

FIG. 7 is a schematic block diagram of a sensor system 300 including a speed magnetic sensor according to one or more embodiments. The sensor system 300 includes speed magnetic sensor 100A or 100B, which is represented by sensor chip 10.

The sensor chip 10 configured to generate at least two output signals OUT1 and OUT2, with a third output signal OUT3 being optional. A microcontroller 30 is configured to receive the output signals OUT1, OUT2, and OUT3 for additional analysis and/or processing.

The first output signal OUT1 may be a selected speed measurement signal and the second output signal OUT2 may be a direction signal or signals representative thereof. Furthermore, third output signal OUT3 may be a twist angle signal that provides the twist angle of the sensor chip 10 based on its twist orientation.

The magnetic chip 10 includes sensor elements 1 or 11 as described in FIGS. 1A and 1B. The sensor elements sense a change in the magnetic field strength that varies (oscillates) as a sinusoidal waveform (i.e., as a signal modulation) modulated by a rotating target object. The sinusoidal waveform has frequency that corresponds to a speed of rotation of the rotating target object, such as a wheel or drive shaft.

The sensor chip 10 includes a sensor circuit 20 that includes a sensor processing circuit 21 configured to receive the analog sensor signals from the sensor elements, and perform signal processing and/or conditioning thereon. The analog sensor signals may be individually received from each sensor element, or may be generated from each differential pair as speed measurement signals and direction signals. If the sensor elements 1, 11 are coupled in a differential configuration, such as a bridge circuit, the sensor processing circuit 21 includes the corresponding differential circuitry. If the analog sensor signals are from individual sensor elements, the sensor processing circuit 21 may also generate the speed measurement signals by applying differential calculus thereto. The sensor processing circuit 21 may also include analog-to-digital converters (ADCs) that convert the analog sensor signals into digital sensor signals.

The processed sensor signals are output from the sensor processing circuit 21 and provided to a speed and direction processing circuit 22. In this example, the speed and direction processing circuit 22 receives a speed measurement signal from each differential pair of sensor elements, as well and any direction signal from the center sensor elements. The speed and direction processing circuit 22 evaluates the magnitude of each speed measurement signal (e.g., via comparison), determines which speed measurement signal is the signal of greatest magnitude, and selects the speed measurement signal having the greatest magnitude for use as the useful speed signal. In the case of speed magnetic sensor 100B, the speed and direction processing circuit 22 also selects one of the sensor signals from sensor elements 11Cx and 11Cy as the useful direction signal. The useful direction signal is a measurement of the same magnetic field component (e.g., Bx or By) corresponding to the selected speed measurement signal. If the sensor signals have not yet been converted to digital, the speed and direction processing circuit 22 may include ADCs that convert the selected (useful) signals into digital signals.

The speed and direction processing circuit 22 may also determine the twist angle of the sensor chip 10 based on the algorithm described above.

The output generator 23 analyzes the selected speed measurement signal and the corresponding direction signal and generates pulsed output signals OUT1 and OUT2. In particular, the output generator 23 may include a current modulator, also referred to as a protocol generator, that receives the selected speed measurement signal and the corresponding direction signal and generates the pulsed output signals OUT1 and OUT2 as output currents according to a programmed current switching protocol or rule set built out of, for example, comparators. The output current may be between two current values in order to generate current pulses. The frequency of the current pulses are directly related to the speed of the target object with the current pulses being triggered when the selected speed measurement signal crosses one or more switching thresholds on a rising transition, a falling transition, or both. The pulsed output signal OUT2 has a same frequency as the pulsed output signal OUT1. However, the pulses of the pulsed output signal OUT2 are either in-phase with the pulses of the pulsed output signal OUT1 (i.e., with zero phase-shift) or completely out-of-phase with the pulses of the pulsed output signal OUT1 (i.e., with a 180° phase-shift) depending on the movement (e.g., rotational) direction of the target object. For example, for a rotating target object, the edges of the pulses of the OUT1 and OUT2 signals may be aligned and in-phase with each other on a condition that the target object is rotating in first direction (e.g., counter-clockwise). In contrast, the edges of the pulses of the OUT1 and OUT2 signals may be aligned and out-of-phase with each other on a condition that the target object is rotating in a second direction (e.g., clockwise). The output generator 23 may determine the direction based on whether the 90° phase-shift between the selected speed measurement signal and the direction signal is positive or negative.

The output generator 23 may also receive and output the twist angle as output signal OUT3, either in analog or digital.

Accordingly, the above embodiments provide twist insensitive mounting of a differential speed sensor 100A and 100B with rotation direction detection and with optional twist angle determination.

While the above embodiments are described in the context of detecting a wheel or camshaft speed, the sensor may be used to detect the rotation speed of any rotating member or object that creates sinusoidal variations in a magnetic field as it rotates and that may be sensed by a sensor, including a crankshaft and transmission speed sensing. For example, a combination of a ferrous wheel and a back bias magnet may be used to generate a time varying magnetic field.

Further, while various embodiments have been described, it will be apparent to those of ordinary skill in the art that many more embodiments and implementations are possible within the scope of the invention. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

What is claimed is:

1. A magnetic sensor configured to detect a rotation of an object, comprising:
   a plurality of sensor elements arranged in a sensor plane of the magnetic sensor, wherein the plurality of sensor elements is configured to generate a plurality of sensor signals in response to sensing an oscillating magnetic field modulated by the rotation of the object, with each sensor signal being generated by one of the plurality of sensor elements,
   wherein the plurality of sensor elements are arranged on a circumference of a circle,
   wherein plurality of sensor elements are grouped into a plurality of pairs of sensor elements, with each pair of sensor elements comprising two sensor elements that are oppositely disposed on the circumference of the circle; and
   a sensor circuit configured to generate a first pulsed output signal based on a selected differential measurement signal that is indicative of a rotational speed of the object,
   wherein the sensor circuit is configured to generate a plurality of differential measurement signals, one for each of the plurality of pairs of sensor elements, using the plurality of sensor signals,
   wherein each of the plurality of differential measurement signals is derived from sensor signals generated by a corresponding pair of sensor elements, and
   wherein the sensor circuit is configured to select a differential measurement signal having a greatest magnitude from among the plurality of differential measurement signals as the selected differential measurement signal.

2. The magnetic sensor of claim 1, wherein the sensor circuit is configured to continuously monitor the magnitudes of each of the plurality of differential measurement signals by comparing the magnitudes with each other and dynamically selecting, among the plurality of differential measurement signals, the differential measurement signal having the greatest magnitude as the selected differential measurement signal.

3. The magnetic sensor of claim 1, wherein the plurality of sensor elements are arranged on the circumference of the circle at equidistant angles about a center of the circle.

4. The magnetic sensor of claim 1, wherein the sensor circuit is configured disregard for output signal generation a remaining portion of the differential measurement signals that are not selected as the selected differential measurement signal.

5. The magnetic sensor of claim 1, further comprising:
   a center sensor element arranged in a center region of the circle in the sensor plane, the center sensor element configured to generate a center sensor signal in response to sensing the oscillating magnetic field,
   wherein the sensor circuit is configured to generate a phase-shifted measurement signal using the center sensor signal, and further generate a second pulsed output signal based on the phase-shifted measurement signal and the selected differential measurement signal.

6. The magnetic sensor of claim 5, wherein a phase of the second pulsed output signal relative to a phase of the first pulsed output signal is indicative of a rotation direction of the object.

7. The magnetic sensor of claim 1, wherein the plurality of sensor elements have a sensing axis that extends orthogonal to the sensor plane and are sensitive to an out-of-plane magnetic field component of the oscillating magnetic field.

8. The magnetic sensor of claim 1, wherein the plurality of pairs of sensor elements include:
at least one first pair of sensor elements sensitive to a first in-plane magnetic field component of the oscillating magnetic field aligned in a first in-plane direction of the senor plane, and
at least one second pair of sensor elements sensitive to a second in-plane magnetic field component of the oscillating magnetic field aligned in a second in-plane direction of the senor plane.

9. The magnetic sensor of claim 8, wherein the first in-plane direction is orthogonal to the second in-plane direction.

10. The magnetic sensor of claim 8, further comprising:
a first center sensor element arranged in a center region of the circle in the sensor plane and is sensitive to the first in-plane magnetic field component of the oscillating magnetic field, wherein the first center sensor element is configured to generate a first center sensor signal in response to sensing the first in-plane magnetic field component of the oscillating magnetic field; and
a second center sensor element arranged in the center region of the circle in the sensor plane and is sensitive to the second in-plane magnetic field component of the oscillating magnetic field, wherein the second center sensor element is configured to generate a second center sensor signal in response to sensing the second in-plane magnetic field component of the oscillating magnetic field,
wherein the sensor circuit is configured to select, based on the selected differential measurement signal, either the first center sensor signal or the second center sensor signal for use as a phase-shifted measurement signal, and further generate a second pulsed output signal based on the phase-shifted measurement signal and the selected differential measurement signal.

11. The magnetic sensor of claim 10, wherein a phase of the second pulsed output signal relative to a phase of the first pulsed output signal is indicative of a rotation direction of the object.

12. The magnetic sensor of claim 1, wherein the circle has a center axis about which the magnetic sensor twists to arrive at different twists orientations having different twist angles relative to a reference direction.

13. The magnetic sensor of claim 12, wherein the sensor circuit is configured to determine a twist angle of the magnetic sensor relative to the reference direction based on the selected differential measurement signal.

14. The magnetic sensor of claim 13, wherein the sensor circuit is configured to generate a twist angle output signal representative of the determined twist angle.

15. The magnetic sensor of claim 12, wherein the magnitudes of each of the plurality of differential measurement signals change based on the twist angle of the magnetic sensor.

16. A method of measuring a rotation of rotating object by a magnetic sensor, the magnetic sensor including a plurality of sensor elements arranged on a circumference of a circle in a sensor plane of the magnetic sensor and being grouped into a plurality of pairs of sensor elements, with each pair of sensor elements comprising two sensor elements that are oppositely disposed on the circumference of the circle, the method comprising:
generating a plurality of sensor signals by the plurality of sensor elements in response to sensing an oscillating magnetic field modulated by the rotation of the rotating object, with each sensor signal being generated by one of the plurality of sensor elements;
generating a first pulsed output signal based on a selected differential measurement signal that is indicative of a rotational speed of the rotating object;
generating a plurality of differential measurement signals, one for each of the plurality of pairs of sensor elements, using the plurality of sensor signals, wherein each of the plurality of differential measurement signals is derived from sensor signals generated by a corresponding pair of sensor elements; and
selecting a differential measurement signal having a greatest magnitude from among the plurality of differential measurement signals as the selected differential measurement signal.

17. The method of claim 16, further comprising:
continuously monitoring the magnitudes of each of the plurality of differential measurement signals by comparing the magnitudes with each other; and
dynamically selecting, among the plurality of differential measurement signals, the differential measurement signal having the greatest magnitude as the selected differential measurement signal as the magnitudes change.

18. The method of claim 16, further comprising:
generating a center sensor signal by a center sensor element arranged in a center region of the circle in the sensor plane in response to sensing the oscillating magnetic field;
generating a phase-shifted measurement signal using the center sensor signal; and
generating a second pulsed output signal based on the phase-shifted measurement signal and the selected differential measurement signal.

19. The method of claim 16, wherein the circle has a center axis about which the magnetic sensor twists to arrive at different twists orientations having different twist angles relative to a reference direction, the method further comprising:
determining a twist angle of the magnetic sensor relative to the reference direction based on the selected differential measurement signal.

20. The method of claim 16, wherein:
the circle has a center axis about which the magnetic sensor twists to arrive at different twists orientations having different twist angles relative to a reference direction, and
the magnitudes of each of the plurality of differential measurement signals change based on the twist angle of the magnetic sensor.

* * * * *